UNITED STATES PATENT OFFICE.

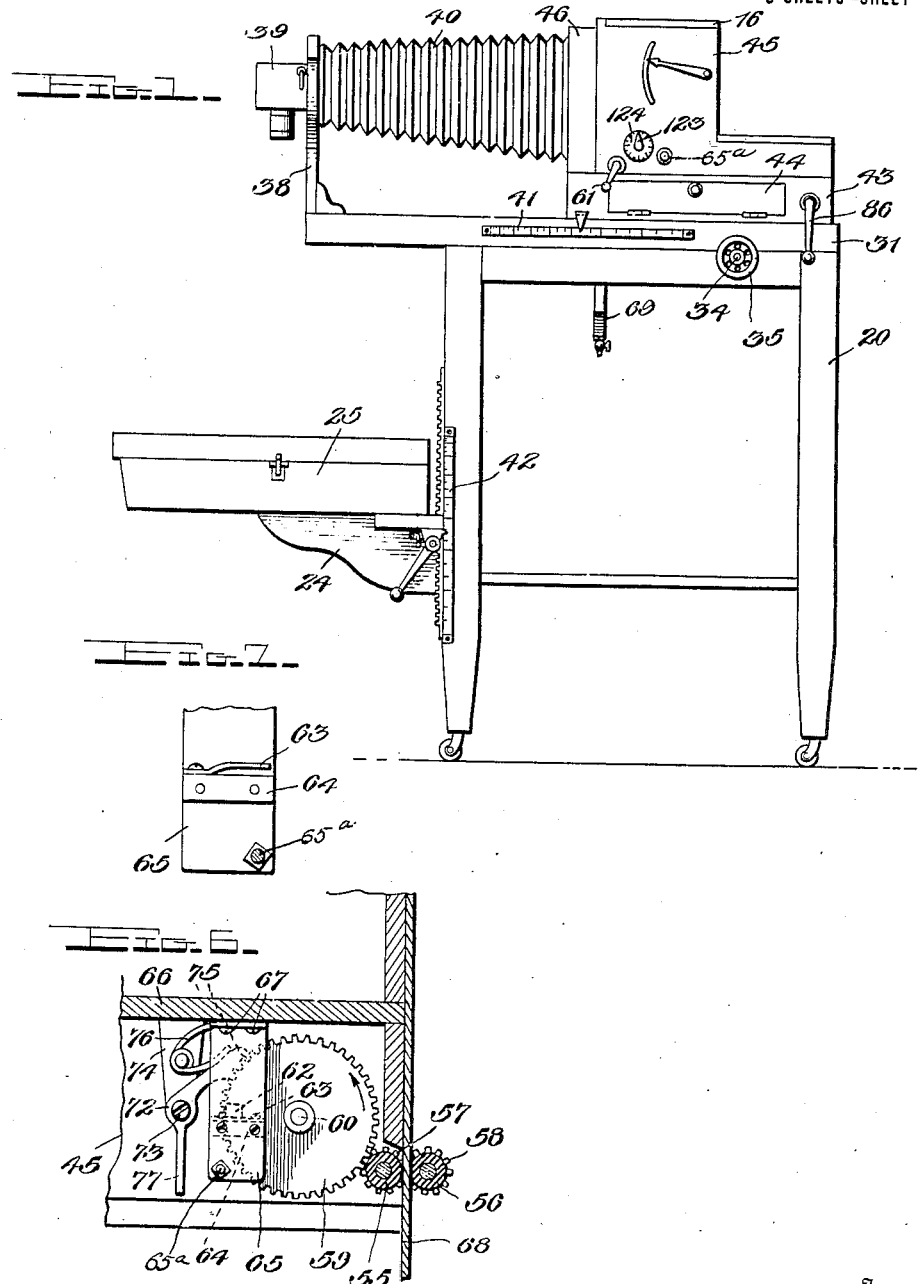

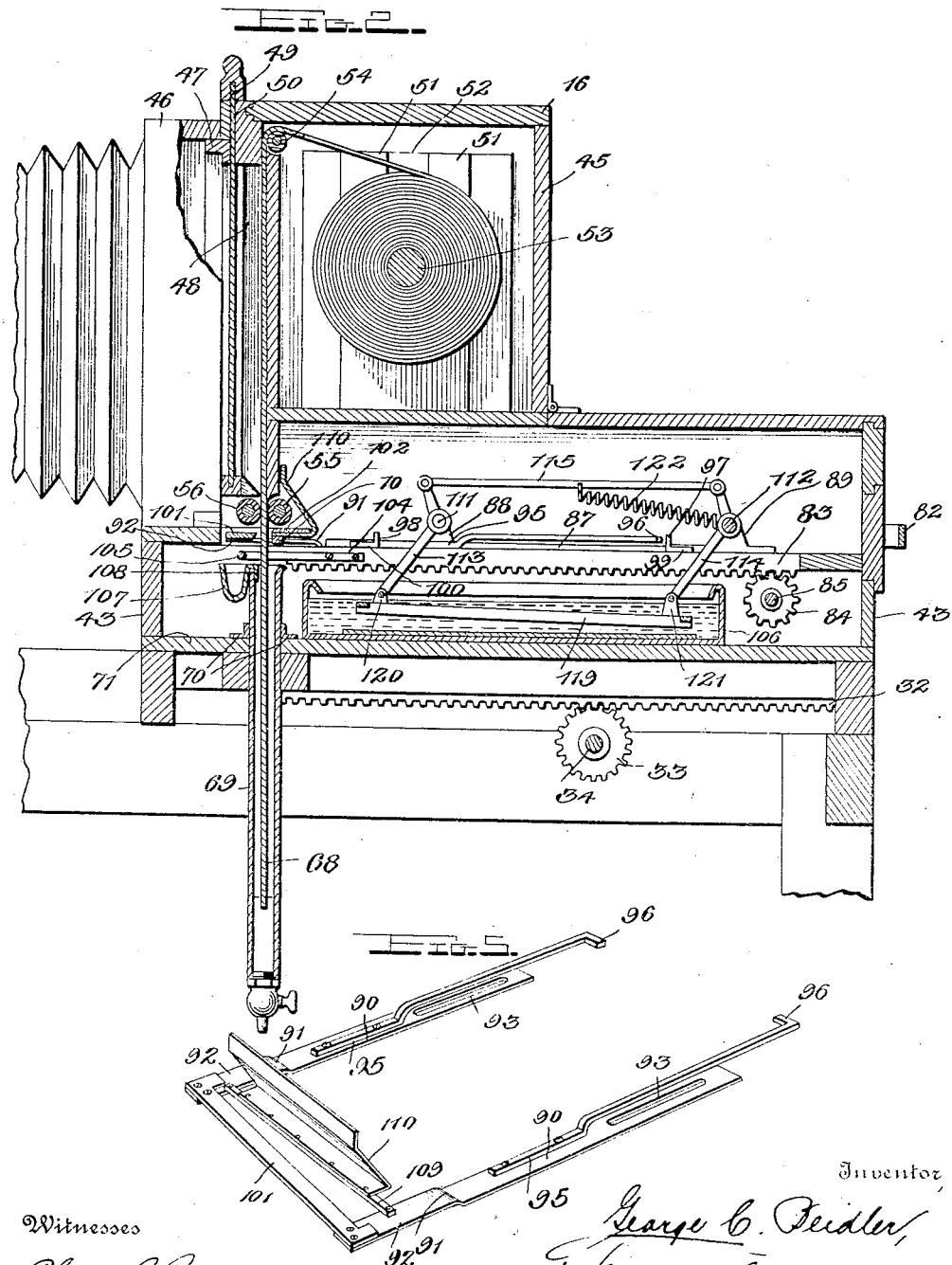

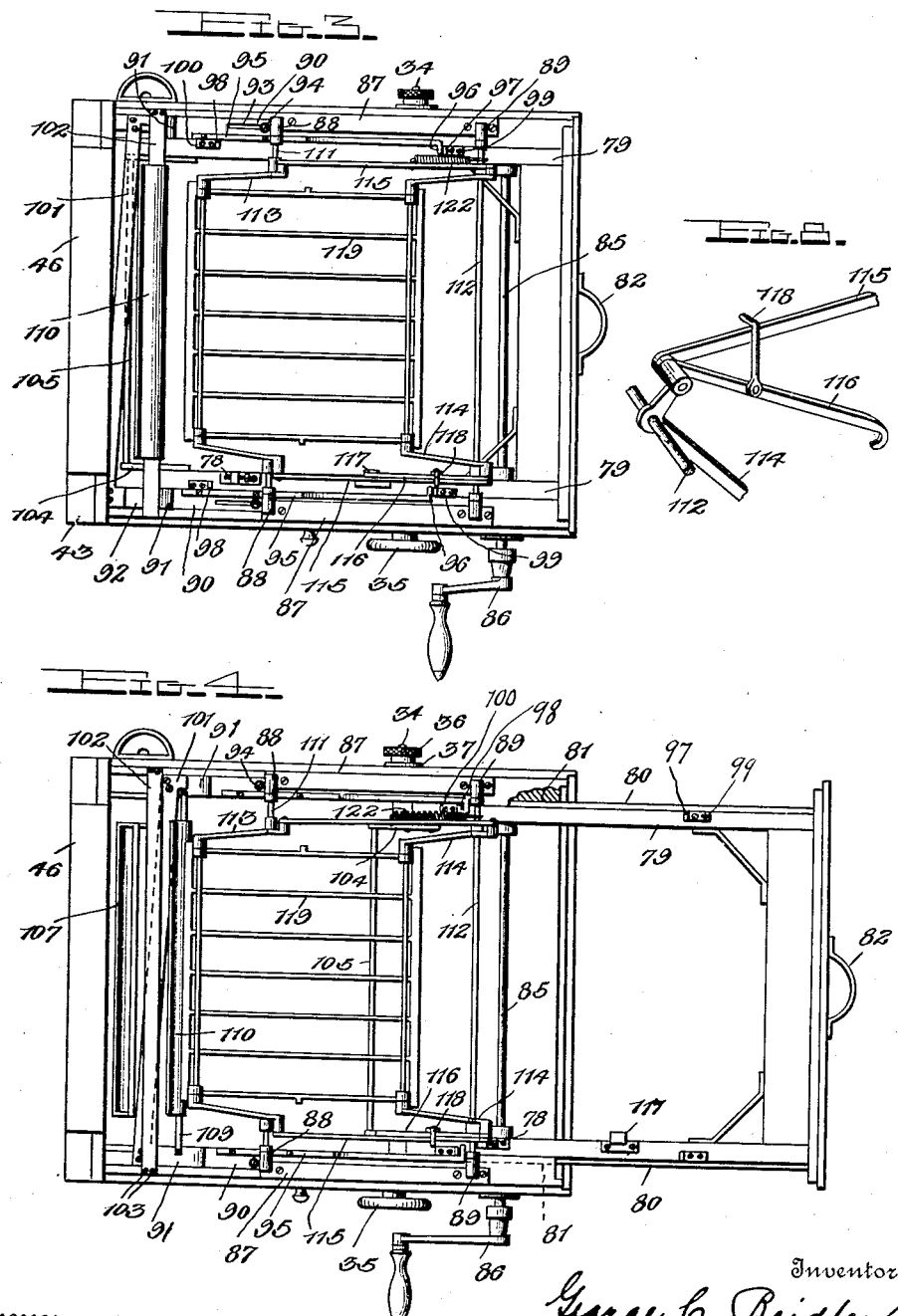

GEORGE C. BEIDLER, OF ROCHESTER, NEW YORK.

PHOTOGRAPHING AND DEVELOPING APPARATUS.

1,157,611.  Specification of Letters Patent.  Patented Oct. 19, 1915.

Application filed December 12, 1912. Serial No. 736,355.

*To all whom it may concern:*

Be it known that I, GEORGE C. BEIDLER, a citizen of the United States of America, and resident of Rochester, in the county of Monroe and State of New York, have invented certain new and useful Improvements in Photographing and Developing Apparatus, of which the following is a specification.

This invention relates to photography and particularly to a photographing apparatus adapted to contain film, expose the said film to light photographically, sever the film or the exposed portion thereof, and finally subject the said film to the action of developing fluid or fluids.

The invention consists in the broad idea to be set forth in the claims herein or allowed during the prosecution of the application, the said claims to be of such scope as to give protection commensurate with the inventive act in view of the state of the art when the said invention was produced.

An object of this invention is to provide a photographing and developing apparatus provided with novel means for treating short sections of film, which short sections are preferably delivered from the magazine or container to an exposing chamber and thereafter to a receptacle for containing developer, novel means being also provided for drawing the film from the receptacle and novel means being further provided for severing that portion of the film which has been treated, from a web or roll or sensitized material.

Furthermore, an object of this invention is to provide a photographing and developing apparatus in which a film or section of film may be exposed to the action of light and thereafter subjected to the action of liquid for chemically treating the film, means being provided for severing the treated section of the film and for delivering the said treated section of film to a receptacle designed to contain a fluid, such as hypo or the like provided for the purpose of fixing the film by the well known photographic process, novel means being also provided for submerging the film in the last mentioned receptacle.

A further object of this invention is to produce a photographing and developing apparatus having novel means for engaging and drawing a film or section of film from the magazine or container and novel means for intermittently arresting and other means for intermittently releasing the said mechanism and the invention further contemplates the provision of novel means designed to coact with the said mechanism for subjecting a length of film to the action of developing fluid and to provide novel means for cutting the treated portion of film and removing it from the web or roll.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a side elevation of a photographing and developing apparatus embodying the invention; Fig. 2 illustrates a transverse sectional view of a fragment of the apparatus illustrated in Fig. 1, a portion thereof being in elevation; Fig. 3 illustrates a top plan view of the interior of the apparatus with a section of the casing removed; Fig. 4 illustrates a view of the parts shown in Fig. 3 differently positioned; Fig. 5 illustrates a perspective view of a traveling knife and parts associated therewith; Fig. 6 illustrates a sectional view disclosing the interior of a fragment of the casing and parts associated therewith; Fig. 7 illustrates a view in elevation of a fragment of the bracket shown in Fig. 6; Fig. 8 illustrates a perspective view showing the hook and its relation to the bell crank and link.

In these drawings 20 denotes a frame which may be of any appropriate type, and 24 brackets for holding a copy support 25.

The frame 20 contains sliding sills 31 having a rack 32 engaged by a pinion 33 mounted on the shaft 34, the said shaft 34 containing an operating handle 35 by which it is turned for the purpose of moving the sills 31 on their frame or support. One of the sills is shown in elevation in Fig. 1 and it is to be understood that the said sill is duplicated on the opposite side of the frame 20. The end of the shaft 34, opposite the handle 35, has a lock nut 36 threaded thereon, which binds against the washer 37 for binding the parts with sufficient friction to prevent accidental rotation of the shaft 34. The sills 31 have a yoke 38 connecting their ends, the said yoke supporting a lens box 39 and one end of the bellows 40. The purpose of having the sills move is to provide for an adjustment of the lens with relation to the copy or object to be photographed and for the purpose of obtaining the proper focus. One of the sills 31 is provided with a scale 41 and the frame 20 is provided with a similar scale 42 so that the support for the object being photographed may be moved relatively to the lens to the same extent that the focusing apparatus may be moved to insure the positioning of the sensitized element, to be hereinafter mentioned, on the focal plane. The copy holder and the means for focusing the lens are not included in the claims of the present application but are illustrative of the relation of parts in self-contained means for holding copy and photographing the same.

The sills 31 act as supports for a box, casing or inclosure which may consist of a series of superposed or connected sections. I will hereinafter refer to the parts last mentioned as a casing, meaning thereby any means for containing a supply of film and parts associated therewith for wholly or in part exposing the film to light and for developing the same.

The casing illustrated herein, as one embodiment of a portion of the invention, consists of a hollow base 43 having a door 44, a magazine or source of film supply 45 removably applied to the base and a bellows frame 46 embracing a flange 47 extending from the front of the magazine 45, which bellows frame and bellows 40, which is attached to the bellows frame, is in communication with the exposing chamber 48 at the front of the magazine 45. The passage of light from the bellows frame to the exposing chamber may be interrupted by the use of a dark slide 49 slidable in a slot 50 in the front of the magazine.

The magazine proper contains guides 51 which hold a bearing 52 in which a core 53 is journaled, which core contains a roll of sensitized material which is designed to be fed or drawn through the exposing chamber 48 over an idler 54 which is mounted in any suitable manner within the magazine. The lower portion of the magazine which is removable from the base 43 is partitioned to exclude light from that portion of the magazine containing the roll of sensitized material and in that portion of the magazine below the partition, feed rolls 55 and 56 are journaled, the said rolls being geared together by the toothed wheels 57 and 58, so that motion communicated to the roll 55 will be communicated to the roll 56.

A gear wheel 59 is mounted on a shaft 60 which shaft 60 is turned by meshing with the toothed wheels 57 when driving the rolls 55 and 56; the said roll 55 being driven by the crank handle 61; and the said gear wheel 59 contains a stop block 62 having a shoulder adapted to come into contact with a spring 63 which is mounted on a rib 64 secured to the bracket 65, the said bracket having one end anchored to the magazine partition 66 by means of the screws 67. The end of the bracket remote from the partition 66 is yieldable and may be pressed away from the wheel 59 to such an extent as to permit the spring 63 and rib 64 to clear the stop block 62. The purpose of the spring 63 is that of a releasing device and it operates as follows: when the wheel 59 has been rotated in the direction of the arrow thereon until the stop block contacts the spring 63 and presses the said spring toward the rib, pressure on the bracket 65 away from the wheel 59 will allow the said spring 63 to pass over the side surface of the stop block to a limited extent so that upon communication of motion to the wheel 59, the stop block will ride over the spring and the rib 64 and allow said wheel to turn one complete rotation, the said bracket springing toward the wheel immediately upon the passage of the stop block from the rib 64, so that the said spring 63 and rib 64 will be in the path of travel of the stop block on the next succeeding rotation of the gear wheel. It will thus be seen that provision can be made for arresting the feeding rolls when the driving wheel has traveled a predetermined distance; in this case, the distance being sufficient to draw the appropriate length of film from the magazine. The bracket 65 is operated by a rod 65$^a$ extending through the casing.

For the purpose of illustrating the use of the invention a film 68 is shown as being engaged by the rolls 55 and 56, the said film in Fig. 2 being shown in the exposing chamber 48 and a portion thereof which, presumably, has already been exposed, being in the vertically disposed receptacle 69 which is adapted to contain developing fluid. The receptacle 69 is held in place by flanges 70 secured on the outer surfaces of the receptacle and resting on the floor 71 of the base 43 for supporting the receptacle in the base.

Referring again to the driving wheel 59, provision is made for preventing its rotation and the consequent feeding of film during such time as portions of the apparatus are out of certain operative relation with other portions of the apparatus, as will be presently explained and for the purpose of holding the driving wheel against movement until the parts are properly associated for feeding and receiving film, a dog 72 is mounted on a pivot 73 under the magazine partition, the pivot being supported by an arm 74 held in any appropriate way. The dog has a series of teeth 75 which engage the teeth of the gear wheel 59; the said dog being pressed into engagement with the gear wheel 59 by the spring 76. The dog 72 has a tail-piece 77 beyond the pivot which is engaged by a trip 78 mounted on a frame 79 which is arranged to travel in ways at the sides of the base. As a means for permitting the frame to travel with relation to the base, I have shown the said frame as provided with a tongue 80 at each side, the said tongues being received by grooves 81 in the sides of the base, although any appropriate means may be provided for assembling these parts. A handle 82 may be grasped by an operator for pulling and pushing the sliding frame, although the sliding frame can be moved more uniformly and to better advantage by means of the rack and pinion construction here shown in which each side of the frame contains a rack 83, each of which is engaged by a pinion such as 84 mounted on a shaft 85, the said shaft 85 being rotated by a crank handle 86. By turning the crank handle in one direction a predetermined number of times, the frame will be projected from the base and a reversal of the movement of the said crank handle will retract the said frame.

The movement of the frame is relied upon to communicate motion to mechanism and devices adapted to withdraw the film from the receptacle 68, sever the film and preferably for delivering the said film to a receptacle containing fixing fluid, or other fluid adapted to act on the film. The base at its upper surface and preferably at each side of the frame has a plate 87 containing two bearings 88 and 89, the plates and bearings being duplicated, as stated, on opposite sides of the frame. The upper surface of the base at each side of the frame is also provided with a plate 90 which is bent upwardly at 91 so that the end 92 thereof is free of the upper surface of the base and has a spring action for a purpose to be presently explained. Each plate has a slot 93 containing a stop pin 94 with relation to which the plate is movable. As a means for communicating the motion of the sliding frame to the said plates, each plate has an arm 95 anchored to it, the said arm extending longitudinally of the frame for a suitable distance and terminating in a lug 96 which is in the path of travel of the shoulders 97 and 98 on the plates 99 and 100 respectively, which plates are secured to the sliding frame in any appropriate way. The plates 90 have a knife 101 at their free ends, the said knife being secured thereto so that it travels as the plates are moved. The knife is diagonally disposed with relation to the sides of the base and is adapted to coact with a stationary knife 102 which is secured to the base by the fastenings 103. The purpose of having the knife diagonally disposed is to provide for a draw-cut between the traveling and stationary knife, which draw-cut has been found to be more effective in severing the film into appropriate lengths.

The sliding frame at its inner end has the plates 104 secured to it, preferably on its inner sides, the said plates extending inwardly beyond the ends of said frame and acting as supports for a cross bar 105 which is carried inwardly past the path of travel of film in its passage from the exposing chamber to the receptacle 69. The purpose of the cross bar 105 is to withdraw the film from the receptacle 69 upon outward travel of the frame, it being understood that the film is held between the drawing rolls 55 and 56 so that as the film is pulled, it travels out of the receptacle 69 and is suspended over the receptacle 106 which is located in the base and may be inserted therein or removed therefrom through the door 44. The cross bar 105 becomes wet from contact with the film which has been in the receptacle 69 and in order to prevent drippings from the said cross bar from gaining access to the wood or metal work within the base, a small drip pan 107 is suspended under the said cross bar when it is in this normal position, the said drip pan having a curved lip 108 which embraces the upper edge of the receptacle 69 whereby the said drip pan is suspended.

As the shoulders on the plates 99 and 100 intermittently actuate the sliding plates, the frame may be moved so that the cross bar 105 draws the film over the receptacle 106 prior to the time the shoulders 98 engage the lugs 96 and actuate the movable knife with relation to the stationary knife, and it is the purpose of the inventor to so proportion and arrange the parts of the cross bar 105 that they will have to move the film into position over the receptacle just prior to the actuation of the knives for severing the film so that said film may be delivered to the receptacle 106.

The raised portions 92 of the sliding plates are further provided with a supporting bar 109 which carries a shield 110 preferably of the configuration shown in Fig. 2, so that the said shield will embrace and protect the stationary knife and guard it against access of liquid, which might have a deterrent or corroding effect on it. The supporting bar 109 performs another useful function, in that the film drawn by the movement of the sliding frame is flexed around the lower edge of the said supporting bar and the film between the rolls and the said supporting bar is without crease or break of any kind which would allow the film to yield under pressure of the movable knife as it is coacting with the stationary knife, hence it has been found in practice that the knives perform their function satisfactorily, notwithstanding the stock which is coated to produce the film is ordinarily difficult of severance.

After the film has been delivered to the receptacle 106 which as employed, usually, contains hypo or fixing fluid, the film will float unless means are provided for submerging it and it is therefore a part of the invention to provide means for submerging the film and for operating the said means. To the end just stated, the bearings 88 and 89 contain shafts such as 111 and 112, the former containing a bell crank 113 and the latter containing a bell crank 114. The shaft 112 is continuous from the bearing 89 on one side of the base to the bearing on the other side thereof, whereas the shaft 111 is duplicated on each side of the said base. The short arms of the bell cranks 113 and 114 on each side of the frame are connected by a link 115 so that motion imparted to one of the bell cranks is communicated to the other. A bell crank 114 has associated with it a depending hook 116, which is mounted on the pivot of the link 115, the said hook extending downwardly and inwardly from the end of the base so that the hook is in the path of travel of a trip 117 which is carried by the frame. The hook is prevented from swinging out of proper position by means of a hanger 118 which is carried thereby and which extends over the link 115 by which it is supported. From an inspection of Fig. 4, it will be seen that the frame is projected to the limit of its outward movement and that the parts have likewise been moved to carry the film over a receptacle, such as might be contained within the base and said film has been severed. Upon a retraction or inward movement of the frame, the trip 117 contacts with the hook and causes an operation of the bell cranks, swinging the said bell cranks inwardly to the positions shown in Fig. 2 where they are shown as extending into the receptacle 106. The immersing frame 119 is illustrated as a grid structure, although the manner of making the said immersing frame or plunger is immaterial, but it is shown as having lugs 120 at the corners of the inner end and lugs 121 at the corners of the outer end, which lugs are suspended on the long arms of the bell cranks. It is preferable that the lugs 121 be slightly longer than the lugs 120 so that the immersing frame is suspended on an incline in order that when it is moved into and out of the receptacle it will be in an inclined position, that is to say, the end toward the outer end of the casing is lower than the opposite end, the film is carried into the liquid in a somewhat tilted position, which is for the purpose of permitting the escape of air bubbles which usually form under a film when said film falls on the liquid.

Owing to the arc of the circle described by the long arms of the bell cranks, the immersing frame moves downwardly and rearwardly in the receptacle and therefore the film is immersed and moved longitudinally of the receptacle, which action further aids in facilitating the escape of air bubbles from beneath the film.

As has been stated, the bell cranks are operated by the inward movement of the frame 79 and in order to provide means for swinging the bell cranks in the direction opposite that imparted by the inwardly moving frame, a spring 122 has one of its ends connected to a link 115 and its opposite end anchored to the shaft 112, the relation of the spring to the parts just described being such that said spring is extended upon the inward movement of the link 115, the tension of the spring being such as to pull the said link rearwardly upon withdrawal or projection of the sliding frame 79, thus returning the immersing frame to an elevated position, clear of the path of travel of the cross bar 105, which pulls the film over the receptacle.

While the operation of the parts and their relation to parts with which they coact have been stated in connection with the description of said parts, the following description of a complete cycle of operation of the apparatus will, it is thought, be helpful to an understanding of the construction, operation and advantages.

Assuming that the receptacle 69 has been supplied with a proper amount of developing fluid and an exposure has been made through the lens, bellows and exposing chamber with the dark slide removed, the film 68 which is of course photographically sensitized will be exposed to light and in condition to be subjected to the action of the developing fluid. In turning the crank 61, the feed rolls 55 and 56 draw film from the magazine into the exposing chamber, whereas the portion of film which has already been exposed is forced into the receptacle 69. As the parts are held against rotation until the frame is within the casing, it follows that when the said frame is in the casing the trip 78 has moved the dog out of engagement with the wheel 59, so that the feeding mechanism will turn, it being necessary to press on the rod 65ᵃ for the purpose of moving the bracket to release the stop block 62 from its engagement with the top of the spring 63 prior to the operation of the feeding mechanism. When the frame is in its position to release the dog, the cross bar 105 will be in position back of the film, so as to embrace the said film and upon outward movement of the frame, due to the turning of the crank handle 86 and consequently the pinions 84, the racks of the sliding frame will cause the said racks to move outwardly, thus the film which is suspended between the feeding rolls will be held thereby while the cross rod 105 pulls that portion of the film which extends into the receptacle out of the receptacle and carries it over the receptacle 106, it being observed that the immersing mechanism will have been actuated by the spring 122 to lift the immersing frame out of the receptacle 106 to such an elevation as to permit the cross rod 105 to pass under said immersing frame. When the immersing frame has moved to such an extent as to cause the shoulders 98 to abut the lugs 96, further movement of the sliding frame will communicate motion to the sliding plates which carry the movable knife and the shield for the stationary knife so that the shield is removed from the stationary knife as the movable knife travels under the said stationary knife. When the sliding frame has been moved to the limit of its outward travel, the crank handle 86 is rotated in a direction opposite to that in which it was rotated to project the frame and therefore the pinion and rack will operate to retract the said frame and move it inwardly. The inward movement of the frame results in causing the trip 117 to engage the hook 116, thereby operating the immersing frame with relation to the receptacle in the manner heretofore stated and as the inward movement of the frame continues, the shoulders 97 contact with the lugs 96 and communicate motion to the sliding plates so that the movable knife and the shield are returned to the position shown in Fig. 3 in which position, the stationary knife is guarded against access of moisture or water to it which might otherwise reach it, due to the distribution of said moisture or water by the movement of the immersing frame or other parts of the apparatus. During the time that the sliding frame is retracted, the feeding mechanism cannot be operated but upon the return of the sliding frame within the casing, the dog is again released from the toothed wheel and the said feeding mechanism may be operated upon the release of the said mechanism by the operation of the bracket which carries the rib 64. The operation is repeated with each successive picture or film exposure and as the receptacle 106 preferably contains hypo or fixing fluid, it will be observed that a film will be exposed to light, developed and fixed, which fixing is a part of the developing procedure in photography, within the apparatus.

It is here stated that the shaft 60 has on its outer end an indicator 123 which operates over a dial 124 employed for the purpose of registering the length of film fed by the rolls.

The foregoing specification includes the use of the terms "film" and "sensitized material" and as the apparatus relates to the subject of photography, film or sensitized material is intended to embrace any material which is photographically sensitized, coated or otherwise treated to be affected by actinic light.

While I have, in the present application, described and shown features such as a reciprocating member for drawing film, means for cutting the film, an immersing device, and means for operating these parts, the claims of the present application are not directed to those features broadly, such features and other features shown in this application not claimed herein constituting parts of the subject matter of other applications filed by me, one of said applications having been filed on the 20th day of May, 1911, Serial Number 628,414 and another of said applications having been filed Jan. 3, 1910, Serial Number 535,939.

I claim—

1. In a machine relating to photography, means for containing a supply of film, means for drawing the film therefrom, a receptacle positioned to receive the film, a stationary knife near the path of travel of the film, a member movable with relation to the stationary knife, means carried thereby for engaging the film and drawing it from the receptacle, a movable knife coacting with the stationary knife, means whereby the movable knife is operated after the film is drawn from the receptacle, and means associated with the knife operating means for guarding the stationary knife.

2. In a machine relating to photography, a casing, a source of film supply associated therewith, means within the casing for drawing film from the source of supply, a receptacle to which film is delivered and in which it is supported by the means for drawing the film, a movable member, means carried thereby for drawing the film from the receptacle, a stationary knife adjacent to which the film is supported, a movable knife, means for supporting the movable knife, means for actuating the said supports, a shield for the stationary knife, and means for movably supporting said shield whereby as the movable knife approaches or recedes from the stationary knife the shield is withdrawn from or applied to the stationary knife.

3. In a machine relating to photography, a casing, a source of film supply associated therewith, means for drawing film from the source of supply, a receptacle to which film is delivered by the means for drawing the film, a movable member, a film engaging device associated with the movable member whereby the said film is drawn from the receptacle, a second receptacle to which the film is delivered, means for immersing the film in the second receptacle, means for operating the movable member, means for communicating motion of the movable member to the means for submerging the film, a stationary knife, a shield for the stationary knife actuated by the movable member, and a movable knife actuated by said movable member.

4. In a machine relating to photography, a casing, a source of film supply, means for drawing film therefrom, a member slidable in the casing, means for reciprocating the said member, sliding plates, means for communicating the motion of the sliding member to the plates intermittently, a knife carried by the sliding plates, a stationary knife with which the first mentioned knife coacts, a rod connecting the sliding plates, said rod being located adjacent the path of travel of the film drawn from the source of supply, means for flexing the film around an edge of the rod below the cutting edges of the knives and for drawing said film approximately horizontally, a receptacle for receiving the film from the means for drawing it from the source of supply, and a receptacle over which the film is drawn by the means for flexing the film, whereby the film will fall into the second mentioned receptacle when cut by the knives.

5. In a machine relating to photography, a casing, a source of film supply, means for drawing film therefrom, a member slidable in the casing, means for reciprocating the said member, sliding plates, means for communicating the motion of the sliding member to the plates intermittently, a knife carried by the sliding plates, a stationary knife with which the first mentioned knife coacts, a rod connecting the sliding plates, said rod being located adjacent the path of travel of the film drawn from the source of supply, means for flexing the film around an edge of the rod below the cutting edges of the knives and for drawing said film approximately horizontally, a receptacle for receiving the film from the means for drawing it from the source of supply, a receptacle over which the film is drawn by the means for flexing the film whereby the film will fall into the second mentioned receptacle when cut by the knives, and means for immersing the film.

6. In a machine relating to photography, a casing having a source of film supply, means for drawing film from the film supply, a film cutting device into operative relation with which the film is delivered by the said drawing means, an abutment for the side of the film, and means for drawing the film and flexing it, where it is to be cut, on the edge of the said abutment whereby the action of the cutting mechanism is facilitated.

7. In a machine relating to photography, a casing having a source of film supply, means for drawing the film from the supply, a member moved by the drawing means, means for limiting the movement of the member, a yieldable device for carrying the means for limiting the motion of the member, means for moving the yieldable device to release the movable member, mechanism for developing the film, means for retaining the movable member stationary while the mechanism is operated to develop the film, thereby locking the drawing means against movement until the developing mechanism has been returned to a position to receive the film, and means for releasing the said moving member upon the return of said mechanism.

8. In a machine relating to photography, a casing, a receptacle within the casing, means for delivering film thereto, bell cranks movably mounted over the casing, an immersing member carried by the said bell cranks, and means operated by the means for delivering film to the receptacle for actuating the bell cranks to move the immersing member with relation to the receptacle.

9. In a machine relating to photography, a casing, a receptacle therein, means for delivering film to the receptacle, bell cranks pivotally mounted above the receptacle and having arms movable over the receptacle, an immersing member carried by said arms, a reciprocating member in the casing, means for communicating the movement of the reciprocating member to the bell cranks when moved in one direction, and means independent of the reciprocating member for moving the bell cranks in the opposite direction.

10. In a machine relating to photography, a casing, a stationary knife therein, a knife movable with relation to the stationary knife and adapted to coact therewith, means for delivering film between the said knives, sliding plates on which the movable knife is mounted, a reciprocating member in the casing, arms on the sliding plates, devices on the reciprocating member for actuating the arms during the movement of the reciprocating member for flexing film, and means for operating the reciprocating member.

11. In a machine relating to photography, a casing, means in the casing for drawing film, a stationary knife and a movable knife adapted to coact, the movable knife standing normally in spaced relation to the stationary knife, the said means for drawing the film being operative to deliver said film between the knives, sliding members on which the movable knife is mounted, arms connected to the sliding members, a reciprocating member, means on the reciprocating member for actuating the arms, means on the reciprocating member adapted to engage the print and pull the same, a receptacle over which the said film is pulled and into which it falls when the movable knife is operated, an immersing frame, means for suspending the immersing frame with relation to the receptacle, means for operating the said suspending means whereby the immersing frame is moved with relation to the receptacle, and means for moving the immersing frame in an opposite direction.

12. In a machine relating to photography, a casing, means in the casing for drawing film, a receptacle to which the film is delivered, said receptacle being adapted to contain developing fluid, said drawing means holding the film in the receptacle, means for pulling the film from the receptacle while being held by the drawing means, a drip pan over which the said pulling means is normally stationed for the reception of liquid collected from the wet film, a second receptacle over which the film is pulled and into which it falls when severed, means for immersing the film therein, a stationary knife and a movable knife between which the film is delivered to the first mentioned receptacle, a reciprocating member, means for communicating the motion of the reciprocating member to the movable knife, and means for communicating the motion of the reciprocating member to the means for immersing the film.

13. In a machine relating to photography, a casing, means in the casing for drawing film, a receptacle to which the film is delivered, said receptacle being adapted to contain developing fluid, said drawing means holding the film in the receptacle, means for pulling the film from the receptacle while being held by the drawing means, a second receptacle over which the film is pulled and into which it falls when severed, means for immersing the film therein, a stationary knife and a movable knife between which the film is delivered to the first mentioned receptacle, a reciprocating member, means for communicating the motion of the reciprocating member to the movable knife and means for communicating the motion of the reciprocating member to the means for immersing the film.

14. In a machine relating to photography, a casing, means in the casing for drawing film, a receptacle to which the film is delivered, said receptacle being adapted to contain developing fluid, said drawing means holding the film in the receptacle, means for pulling the film from the receptacle while being held by the drawing means, a drip pan over which the said pulling means is normally stationed for the reception of liquid collected from the wet film, a second receptacle over which the film is pulled and into which it falls when severed, means for immersing the film therein, a stationary knife and a movable knife between which the film is delivered to the first mentioned receptacle, a reciprocating member, arms actuated by the reciprocating member, sliding plates to which the movable knife is attached, said sliding plates being resilient and operated to hold the movable knife in contact with the stationary knife, means for communicating the motion of the reciprocating member to the sliding plates, and means for communicating the motion of the reciprocating member to the means for immersing the film.

In testimony whereof, I hereunto affix my signature in the presence of two witnesses.

GEORGE C. BEIDLER.

Witnesses:
E. W. HAMILTON,
R. B. LA FORCE.